R. B. FITTS.
FEED BAG OR VESSEL FOR CAVALRY HORSES.
No. 33,318. Patented Sept. 17, 1861.
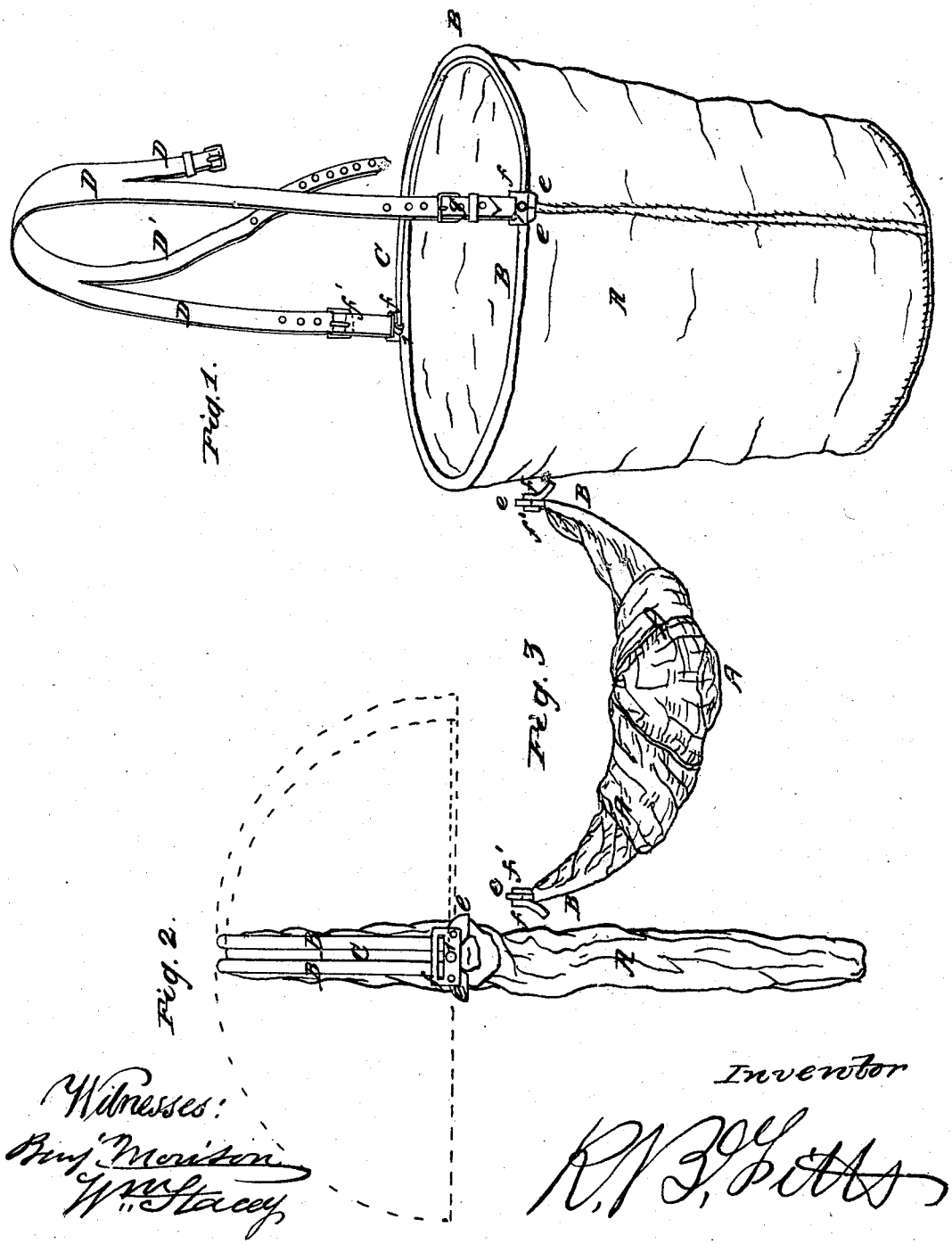

UNITED STATES PATENT OFFICE.

R. B. FITTS, OF PHILADELPHIA, PENNSYLVANIA, ASSIGNOR TO HIMSELF, E. P. THOONBERG, AND WM. STACEY, OF SAME PLACE.

IMPROVED FEED-BAG FOR HORSES AND OTHER ANIMALS.

Specification forming part of Letters Patent No. 33,318, dated September 17, 1861.

*To all whom it may concern:*

Be it known that I, R. B. FITTS, of the city of Philadelphia, in the State of Pennsylvania, have invented a new and Improved Feed Bag or Vessel for Cavalry Horses; and I do hereby declare that the following is a full and exact description of the same, reference being had to the annexed drawings, making a part of this specification, in which—

Figure 1 is a perspective view of the said vessel as expanded and made ready for immediate application to the horse's head; Fig. 2, the same as collapsed, preparatory to its being condensed into the crescent form shown in Fig. 3 for packing it behind the cantle of a saddle.

Like letters indicate the same parts when in the different figures.

This invention has for its object the production of a light and ready vessel, which will serve for both the purposes of feeding and watering cavalry horses, as occasion may require, in camp or on the march, and that can be readily folded into a small crescent form, so as to adapt it for being conveniently attached and carried behind the cantle of a saddle; and it consists of a water-proof flexible receiver or holder provided with a jointed rim, a drop-bail, and a detachable headstall, arranged and combined together as hereinafter described and set forth.

In the drawings, A is the flexible receiver or holder; B, the jointed rim; C, the drop-bail, and D the headstall, the latter not being shown in Figs. 2 and 3.

The holder A may be made of any suitable flexible fabric, as gum-cloth or water-proofed sail-duck, of such a capacity and form as will be suitable for giving roomy admittance to the lower portion of a horse's head and a due portion of grain as feed.

The rim B consists of two semicircular pieces of stiff iron wire flattened at their ends *e e*, and hinged together by rivets through them and the plates *f f*, so that when the vessel is opened, as seen in Fig. 1, the said ends of the semicircular pieces constituting the said rim B may abut against each other, respectively, so as to form a rigid circular mouth-rim for the said vessel, as seen in the same figure.

The bail C consists of a lighter piece of iron wire bent into a semicircular form and hooked into the holes 1 1 of the two outside plates *f f*, so as to produce a drop-bail that, when down, will rest upon the jointed rim B of the vessel, as seen in Fig. 1. The rim B and bail C can therefore be folded up together into the condition shown in Fig. 2, and the flexible holder A then wound closely around the said folded rim and bail, substantially into the compact crescent form seen in Fig. 3, which well adapts it for being strapped fast to the rear of a cavalry-saddle by means of the detachable headstall D.

The headstall D is provided with a throat-band D' to buckle it fast on the horse's head, and with suitable buckles and straps *g g* for attaching and detaching it to and from the plates *f f* of the rim B.

It is intended in attaching the apparatus to a saddle to detach one end of the headstall and wind the whole around the vessel reduced or condensed into the crescent form seen in Fig. 3, at the same time attaching it to the saddle.

Cavalry on the march or in camp are often in places where water must be carried and held for the horses to drink, and in such circumstances it is manifest that the present invention will be found excellently well adapted aside from its advantages as a feed-bag, it being provided with a bail C, so as to adapt it for use as a bucket for the purpose of carrying and serving the water.

The apparatus is cheap, light, and very appropriate for the army.

Having thus fully described the whole apparatus and shown its utility, what I claim as my invention, and desire to secure by Letters Patent, is—

The holder or vessel A, the jointed rim B, bail C, strap D, constructed and operating substantially as and for the purposes herein described.

R. B. FITTS.

Witnesses:
BENJ. MORRISON,
WM. STACEY.